US012744769B2

(12) United States Patent
Breitner et al.

(10) Patent No.: US 12,744,769 B2
(45) Date of Patent: Sep. 22, 2026

(54) DATA AUTHENTICATION IN DISTRIBUTED NETWORKS

(71) Applicant: DFINITY STIFTUNG, Zürich (CH)

(72) Inventors: Joachim Breitner, Freiburg im Breisgau (DE); Jan Camenisch, Thalwil (CH); Andrea Cerulli, Zürich (CH); David Derler, Horgen (CH); Roman Kashitsyn, Pfäffikon (CH); Gregory Neven, Oberrieden (CH); Bogdan Warinschi, Wollerau (CH)

(73) Assignee: DFINITY STIFTUNG, Zürich (CH)

( * ) Notice: Subject to any disclaimer, the term of this patent is extended or adjusted under 35 U.S.C. 154(b) by 0 days.

(21) Appl. No.: 18/559,240

(22) PCT Filed: May 7, 2021

(86) PCT No.: PCT/EP2021/062209
§ 371 (c)(1),
(2) Date: Nov. 6, 2023

(87) PCT Pub. No.: WO2022/233437
PCT Pub. Date: Nov. 10, 2022

(65) Prior Publication Data

US 2024/0236075 A1 Jul. 11, 2024

(51) Int. Cl.
*H04L 9/40* (2022.01)
*H04L 9/00* (2022.01)
(Continued)

(52) U.S. Cl.
CPC .......... *H04L 63/0823* (2013.01); *H04L 9/085* (2013.01); *H04L 9/3239* (2013.01);
(Continued)

(58) Field of Classification Search
CPC . H04L 63/0823; H04L 9/3239; H04L 9/3247; H04L 9/3255; H04L 9/3263; H04L 9/50; H04L 9/085
See application file for complete search history.

(56) References Cited

U.S. PATENT DOCUMENTS

2020/0313862 A1* 10/2020 Troia .................... H04L 9/3236
2020/0412542 A1* 12/2020 Bartolucci ............ H04L 9/3066
(Continued)

FOREIGN PATENT DOCUMENTS

WO 2019171269 A1 9/2019
WO 2021050929 A1 3/2021

OTHER PUBLICATIONS

International Preliminary Report on Patentability for Application No. PCT/EP2021/062209, mailed Jul. 12, 2023, 64 pages.
(Continued)

*Primary Examiner* — Azizul Choudhury
(74) *Attorney, Agent, or Firm* — Mannava & Kang, P.C.

(57) ABSTRACT

Embodiments of the invention relate to a computer-implemented method for authenticating data in a distributed network. The distributed network comprises at least one application subnet. The application subnet comprises a plurality of nodes and each of the plurality of nodes is configured to run one or more computational units. The computational units are configured to execute computations in a deterministic and replicated manner across the application subnet. The method comprises steps of regularly computing, by the plurality of nodes of the application subnet, a digest of an application subnet accumulator. The application subnet accumulator comprises for each of the computational units of a respective application subnet an assigned accumulator element as unit variable. The method comprises further steps of regularly executing, by the nodes of the application subnet, a joint signature on the digest of the application
(Continued)

subnet accumulator, thereby producing an application subnet certificate. Further aspects relate to a distributed network, a node of a distributed network and a corresponding computer program products.

20 Claims, 12 Drawing Sheets

(51) Int. Cl.
*H04L 9/08* (2006.01)
*H04L 9/32* (2006.01)

(52) U.S. Cl.
CPC .......... *H04L 9/3247* (2013.01); *H04L 9/3255* (2013.01); *H04L 9/3263* (2013.01); *H04L 9/50* (2022.05)

(56) References Cited

U.S. PATENT DOCUMENTS

2021/0336776 A1* 10/2021 Bartolucci ............ H04L 9/3073
2022/0271957 A1* 8/2022 Zamani ................. H04L 9/3239

OTHER PUBLICATIONS

Paul Feldman, "A Practical Scheme for Non-interactive Verifiable Secret Sharing", 28th Annual Symposium on Foundations of Computer Science, Oct. 12-14, 1987, pp. 427-437.
R. C. Merkle, "A Digital Signature Based on a Conventional Encryption Function", Advances in Cryptology, CRYPTO '87, Lecture Notes in Computer Science, pp. 369-378, Year 1988.
Rosario Gennaro et al., "Secure Distributed Key Generation for Discrete-Log Based Cryptosystems", Journal of Cryptology, Eurocrypt'99, vol. 1592 of Lecture Notes in Computer Science, pp. 295-310, May 2-6, 1999.
Timo Hanke et al., "DFINITY Technology Overview Series Consensus System", May 11, 2018, 16 pages.(https://doi.org/10.48550/arxiv.1805.04548).
Torben Pryds Pedersen, "A Threshold Cryptosystem (Extended abstract)", Advances in Cryptology, Eurocrypt '91, LNCS vol. 547, pp. 522-526, 1991.

* cited by examiner

DATA AUTHENTICATION IN DISTRIBUTED NETWORKS

CLAIM FOR PRIORITY

The present application is a national stage filing under 35 U.S.C 371 of PCT application number PCT/EP2021/062209, having an international filing date of May 7, 2021, the disclosure of which is hereby incorporated by reference in its entirety.

TECHNICAL FIELD

The present invention pertains to a computer-implemented method for signing and/or authenticating data of or in a distributed network.

Further aspects relate to a distributed network, a node of a distributed network and a corresponding computer program product.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such a consensus may be achieved by various consensus protocols.

In one type of blockchain networks, consensus is achieved by using a proof-of-work algorithm. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to create new blocks.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Consensus protocols used in blockchain networks can be designed to reach fast finality on transactions contained in blocks by applying a "Byzantine fault tolerant" (BFT) agreement protocol. "Synchronous" BFT protocols rely on network synchrony assumptions for safety, while "asynchronous" BFT protocols do not. Asynchronous BFT protocols can typically tolerate less than ⅓ (one third) corrupt participating nodes.

Apart from cryptocurrencies, distributed networks may be used for various other applications.

In particular, they may be used for providing decentralized and distributed computing capabilities and services.

One challenge of such distributed networks which provide distributed computing services is to provide efficient mechanisms for providing access to computational results of the distributed network/the distributed computing service and in particular to provide such access in an authenticable manner.

DISCLOSURE OF THE INVENTION

Accordingly, one object of an aspect of the invention is to provide an advantageous method for data authentication in distributed networks.

According to an embodiment of an aspect of the invention, a computer-implemented method for authenticating data in a distributed network is provided. The distributed network comprises at least one application subnet. The application subnet comprises a plurality of nodes and each of the plurality of nodes is configured to run one or more computational units. The computational units are configured to execute computations in a deterministic and replicated manner across the application subnet. The method comprises steps of regularly computing, by the plurality of nodes of the application subnet, a digest of an application subnet accumulator. The application subnet accumulator comprises for each of the computational units of a respective application subnet an assigned accumulator element as unit variable. The method comprises further steps of regularly executing, by the nodes of the application subnet, a joint signature on the digest of the application subnet accumulator, thereby producing an application subnet certificate.

Such an embodied method provides for each of the computational units an accumulator element in the application subnet accumulator which may be considered as a kind of certified interface between the application subnet and the computational units. More particularly, the computational units may store in their respective assigned accumulator elements unit variables that shall be certified/signed by the application subnet. Such unit variables may be generally any kind of data of the computational units, in particular data that the computational units wants to have certified in order to provide it in an authenticable manner. As the joint signature on the digest of the accumulator is performed by the nodes of the application subnet, the corresponding accumulator elements of the computational units are also certified by this signature. As a result, single nodes of the application subnet can use the application subnet certificate to authenticate data that is stored by a computational unit in their respective accumulator element. Hence methods according to embodiments of the invention allow an efficient and secure authentication/verification of the accumulator elements.

According to an embodiment, the method further comprises regularly updating, by the plurality of computational units of the application subnet, the corresponding unit variables of their assigned accumulator elements of the application subnet accumulator.

With such a regular update and a corresponding regular execution of the joint signature the computational units get regularly a certified unit variable which can be used to provide authenticable responses to user requests.

According to an embodiment, the method further comprises regularly computing, by each of the computational units of the application subnet, a digest of a unit accumulator, the unit accumulator comprising a representation of the unit state of the respective computational unit. The accumulator elements of the unit accumulator comprise computational results of the respective computational unit. The embodied method further comprises regularly writing the digest of the unit accumulator as unit variable into the corresponding accumulator element of the application subnet accumulator.

Such an embodiment provides an efficient and secure solution for the computational units to get a certification not only on the unit variable, but also via the unit accumulator on a plurality of computational results which are stored in the accumulator elements of the unit accumulator. Accordingly, the computational units get regularly certified computational results which can be used to provide authenticable responses to user requests for such computational results.

The application subnet accumulator and the unit accumulator may be generally any kind of accumulator, i.e. any entity, unit or algorithm which combine a (large) set of accumulator elements into a (short) digest such that there is a (short) witness that a given accumulator element is indeed a valid element of the accumulator.

According to preferred embodiments, the application subnet accumulator and the unit accumulator may be embodied as cryptographic accumulators. Such cryptographic accumulators may provide additional advantageous properties such as compactness of the witness and/or the digest.

According to a particularly preferred embodiment, the application subnet accumulator may be embodied as application subnet hash tree. Such an application subnet hash tree establishes an advantageous instantiation of the application subnet accumulator. Accordingly, the digest of the application subnet accumulator is embodied as root hash of the application subnet hash tree and the assigned accumulator elements of the one or more computational units are embodied as leaves of the application subnet hash tree.

According to embodiments, the unit accumulator may also be embodied as unit hash tree. Accordingly, the digest of the unit accumulator is then embodied as root hash of the unit hash tree and the assigned accumulator element is embodied as leaf of the unit hash tree.

According to embodiments, the unit variables of the computational units are securely linked with an identifier of the corresponding computational units. Such an identifier identifies the computational unit corresponding to the computational result. This allows to verify that the value of the unit variable does indeed belong to the so identified computational unit.

According to embodiments, the joint signature may be a threshold signature. According to further embodiments, the joint signature may be a multi-signature.

According to embodiments, the method may comprise further steps of receiving a request for computational results of one of the plurality of computational units of the application subnet. Such a request may be sent e.g. by a user of the distributed network to a single node of an application subnet which runs a computational unit corresponding to the request. A computational result may generally be any kind of processing result of the computational unit. This may include e.g. a confirmation of the booking of a trip or flight, a confirmation of a banking transaction, an order confirmation etc.

The method may comprise a further step of compiling or computing a witness of the application subnet accumulator and a witness of the unit accumulator. The witness of the application subnet accumulator comprises authentication information for authenticating the accumulator element of the application subnet accumulator of the respective computational unit and the witness of the unit accumulator comprises authentication information for authenticating the accumulator element of the unit accumulator of the requested computational result.

Then in a further step, the requested node, in particular the computational unit running on the requested node, may provide to the user the latest application subnet certificate, the witness of the application subnet accumulator, the witness of the unit accumulator and the requested computational result as response to the request.

This provided information forms a package that can then be used by the user to verify/authenticate the received computational result.

According to an embodiment, the method further comprises performing consecutive consensus rounds to reach a consensus on a sequence of payloads and performing consecutive processing rounds comprising a consecutive processing of the sequence of payloads in a deterministic and replicated manner. Further steps may include to update the application subnet accumulator, in particular by the nodes of the application subnet, at the end of each of the consecutive processing rounds.

According to a further embodiment, the method may comprise steps of updating, by each of the computational units of the application subnet, at the end of each of the processing rounds, the unit state accumulator and the corresponding unit variable of the application subnet accumulator.

Such a regular update of the application subnet accumulator and the unit variables of the application subnet accumulator and a subsequent joint signature on the accumulator digest is an efficient method to regularly provide for all computational units of the application subnet a possibility to have their latest computational results certified.

According to an embodiment, the distributed network may comprise a plurality of application subnets and a root subnet comprising a plurality of root nodes. Such a root subnet may be configured to provide administrative, managerial and control functionality to the network. One functionality of such a root subnet may be in particular the management of the subnet public keys/verification keys. More particularly, according to such an embodiment the plurality of root nodes may compute regularly a root subnet accumulator. The root subnet accumulator may comprise for each of the plurality of application subnets an assigned accumulator element as key variable which comprises an application subnet public key of the corresponding application subnet. According to such an embodied method the root nodes may regularly execute a joint signature on the digest of the root subnet accumulator and thereby produce a root subnet certificate.

Such a root subnet certificate may then be used for a subsequent verification of the application subnet public keys. More particularly, the root subnet may receive requests for an application subnet public key by one of the application subnets and may provide in response the latest root subnet certificate, a corresponding witness, and the respective application subnet public key.

According to embodiments, the root subnet accumulator may also be embodied as root subnet hash tree.

A user or user entity of the distributed network which has issued a request to a node of the application subnet for a computational result receives in response a package comprising an application subnet certificate, a witness of the application subnet accumulator, a witness of the unit accumulator and the requested computational result. The user entity may then authenticate the computational result as follows:

At first, provided it knows already the corresponding application subnet public key, it verifies the digest of the application subnet accumulator by means of the application subnet certificate, i.e. it verifies the joint signature on the digest by means of the application subnet public key. Then it verifies the accumulator element/unit variable of the respective computational unit by recalculating the digest of the application subnet accumulator by means of the corresponding witness. And then, it verifies the requested computational result by recalculating the digest of the unit accumulator by means of the corresponding witness of the unit accumulator.

In case the requesting entity is not aware of the respective application subnet public key, it may issue a request for the corresponding application subnet public key to the root subnet. It receives then a package comprising the application subnet public key, the root subnet certificate and a corresponding witness of the root subnet accumulator. In a similar manner as above, it may then verify the digest of the root subnet accumulator by means of the root subnet certificate and verify the application subnet public key by recalculating the digest of the root subnet accumulator by means of the witness of the root subnet accumulator. The so verified application subnet public key can then be used for the verification of the application subnet certificate.

According to embodiments, a response to a request for a computational result may comprise by default also the application subnet public key, the root subnet certificate and the corresponding witness of the root subnet accumulator. In other words, a response to a request for a computational result comprises an extended package. The extended package comprises an application subnet certificate, a witness of the application subnet accumulator, a witness of the unit accumulator, the requested computational result, the application subnet public key, the root subnet certificate and the corresponding witness of the root subnet accumulator.

This has the advantage that it avoids an additional request of the user and the response is self-contained. Furthermore, it facilitates an efficient validation and avoids that the root subnet must be accessible by the user. More particularly, the root subnet may work in the background and may only communicate with the application subnets.

According to an embodiment the distributed network may use or provide different representations of the application subnet accumulator, the unit accumulator and/or the root subnet accumulator and perform an adaptive transformation between the different representations of the application subnet accumulator, the unit accumulator and/or the root subnet accumulator. This may be used in particular to improve/reduce the witness size and/or to improve/reduce the computational effort for the regular updates of the respective accumulators.

The different representations may encompass a canonical state representation, a partial canonical state representation and a hash tree state representation.

According to an embodiment of another aspect of the invention, a distributed network is provided.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
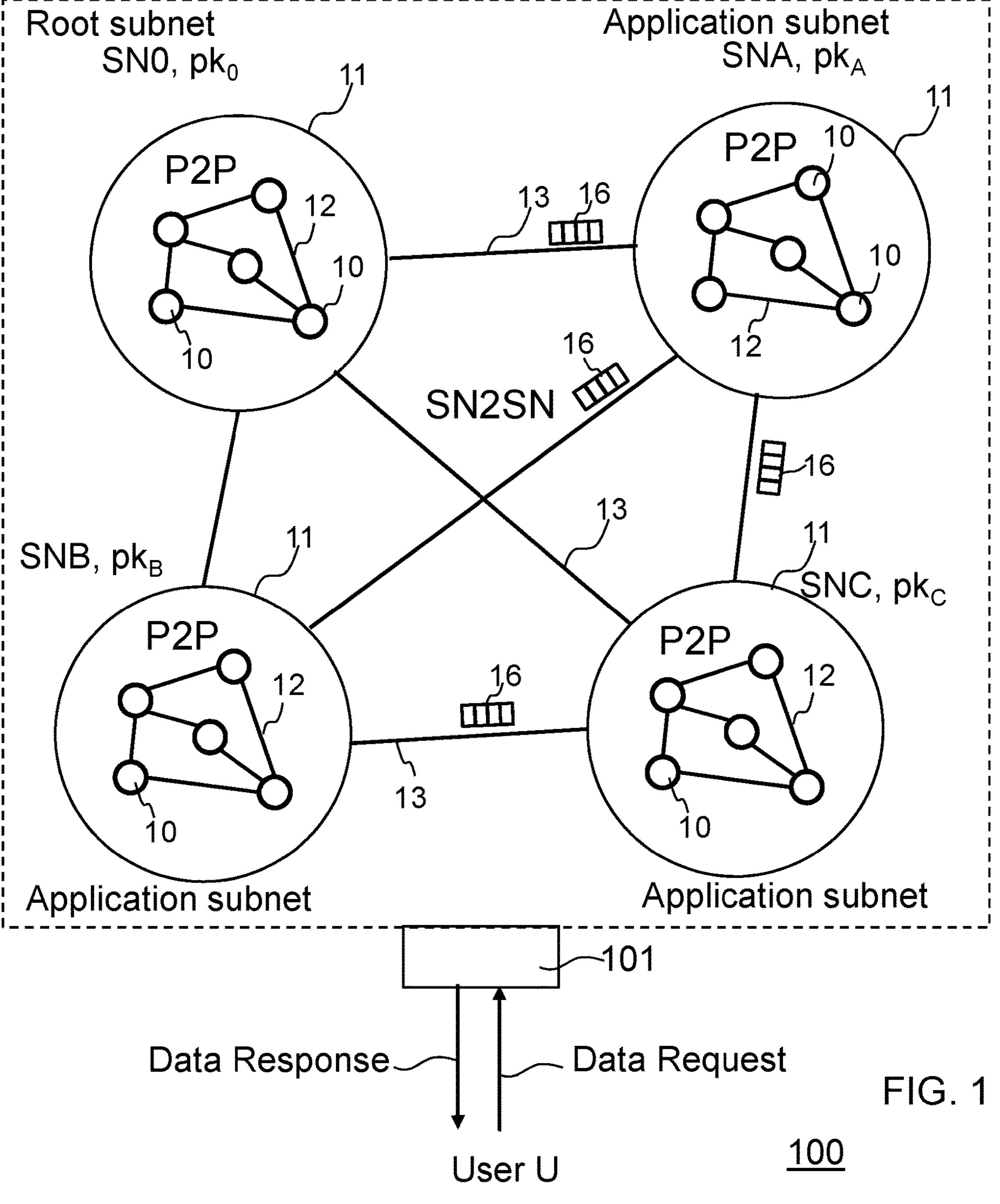
FIG. 1 shows an exemplary diagram of a distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain"

shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key: a bit-string of a public key signature scheme intended to be widely publicized. A verification key may also be denoted as public key and may be used e.g. for the verification of digital signatures of the public key signature scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message.

Distributed key generation (DKG): a protocol enabling a set of dealers to create a public key, in particular a verification key, and provide a set of receivers with a secret key share of the corresponding secret key.

According to embodiments, the Feldman protocol [Fel87], joint Feldman protocol [Ped91] and the GJKR protocol [GJKR99] may be used as distributed key generation protocols. These protocols are e.g. published as follows and their corresponding disclosure is herewith incorporated by reference:

[Fel87] Paul Feldman. A practical scheme for non-interactive verifiable secret sharing.

In 28th Annual Symposium on Foundations of Computer Science, pages 427-437, Los Angeles, California, Oct. 12-14, 1987. IEEE Computer Society Press.

[Ped91] Torben P. Pedersen. A threshold cryptosystem without a trusted party (extended abstract) (rump session). In Donald W. Davies, editor, Advances in Cryptology—EUROCRYPT'91, volume 547 of Lecture Notes in Computer Science, pages 522-526, Brighton, UK, April 8-11, 1991. Springer, Heidelberg, Germany.

[GJKR99] Rosario Gennaro, Stanislaw Jarecki, Hugo Krawczyk, and Tal Rabin. Secure distributed key generation for discrete-log based cryptosystems. In Jacques Stern, editor, Advances in Cryptology—EUROCRYPT'99, volume 1592 of Lecture Notes in Computer Science, pages 295-310, Prague, Czech Republic, May 2-6, 1999. Springer, Heidelberg, Germany.

Accumulator: Generally a digest accumulating a plurality of accumulator elements. More particularly any entity, unit, logic or algorithm which combines a set of accumulator elements, in particular a large set of accumulator elements, into a digest or in other words an accumulator value, in particular a short digest/accumulator value, such that there is a witness, that a given accumulator element is indeed a valid element of the accumulator. At the same time it is intractable to come up with a witness for an element not in the accumulator. According to embodiments an accumulator may be a hash of all the accumulator elements. A witness for an accumulator element X in such an embodiment would consist of all accumulator elements except X.

Cryptographic accumulator: A cryptographic accumulator may be defined as an accumulator which is configured to or allows to succinctly represent a set of accumulator elements as a compact digest or in other words as a compact accumulator value. For each accumulator element that is part of the accumulated set of accumulator elements one can obtain a compact witness to attest membership of the accumulator element relative to the compact accumulator value/digest, whereas it is intractable to obtain a valid witness for an element which is not part of the accumulated set of accumulator elements.

According to embodiments cryptographic accumulators may have additional, in particular sophisticated features like the support for non-membership witnesses for elements which are not in the accumulated set, or creating a single compact witness that allows to verify membership of batches of elements relative to the accumulator.

According to embodiments cryptographic accumulators may be viewed as a realization of the concept of accumulators introduced above, which relies on cryptographic hardness assumptions to realize succinctness features of the accumulator value/digest and/or the witnesses.

Hash tree: A hash tree may also be denoted as Merkle-tree and was originally described by Ralph Merkle in Merkle, R. C. (1988). "A Digital Signature Based on a Conventional Encryption Function". *Advances in Cryptology—CRYPTO '87. Lecture Notes in Computer Science.* 293. pp. 369-378.

A hash tree may be generally described as a tree in which every leaf node is labelled with the cryptographic hash of data elements and every non-leaf node is labelled with the cryptographic hash of the labels of its child nodes. Hash trees may be considered as a generalization of hash lists and hash chains.

According to embodiments hash trees can be used to instantiate cryptographic accumulators, but may also provide additional features like assigning an implicit ordering to the accumulator elements.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnetworks 11. The plurality of subnetworks 11 may in the following also be denoted as subnets 11. In the example of FIG. 1, four subnets 11 denoted with SN0, SNA, SNB and SNC are provided.

Each of the plurality of subnets 11 is configured to run a set of computational units on each node 10 of the respective subnet 11. According to embodiments, a computational unit shall be understood as a piece of software, in particular as a piece of software that comprises or has its own unit state. The unit state may also be denoted as execution state.

The subnet SN0 establishes a first subnet and may also be denoted as root subnet. The root subnet SN0 may be in particular embodied as governance subnet which performs various governance or in other words management functions for the distributed network 100. In particular, the root subnet may generate its own public key $pk_0$ as well as public keys $pk_A$, $pk_B$ and $pk_C$ for the subnetworks SNA, SNB and SNC. The public keys may be in particular embodied as verification keys.

The subnets SNA, SNB and SNC are embodied as application subnets. The application subnets may be in particular configured to provide (application) services to users of the distributed network. More particularly, the computational units which run on the application subnets SNA, SNB and SNC are configured to provide (application) services to users of the distributed network. The application services may be any kind of digital services or digital applications such as banking services, financial services, booking services, games, social media, computing services etc.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets.

According to embodiments, the distributed network may be in particular configured to exchange inter-subnet messages 16 between the subnets SNA, SNB, SNC and SND via a messaging protocol.

According to embodiments, a unit state or execution state shall be understood as all the data or information that is used by the computational unit, in particular the data that the computational unit stores in variables, but also data the computational units get from remote calls. The unit state/execution state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnets 11 are configured to replicate the set of computational units across the respective subnet 11. More particularly, the subnets 11 are configured to replicate the unit state/execution state of the computational units across the respective subnet 11.

Each of the subnets 11 holds an individual or in other words separate public key/verification key of a public-key signature scheme. In this example the subnet SN0 holds a verification key $pk_0$, the subnet SNA holds a verification key $pk_A$, the subnet SNB holds a verification key $pk_B$ and the subnet SNC holds a verification key $pk_C$. A verification key may be in the following generally referred to as $pk_X$, wherein X denotes a corresponding subnet. The public keys/verification keys of the applications subnets SNA, SNB and SNC may be in the following denoted as application subnet public keys.

According to embodiments of the invention the application subnet public keys $pk_X$ are generated by a distributed key generation protocol performed by the root subnetwork SN0. More particularly, the root subnetwork $SN_0$ generates its own verification key $pk_0$ (root subnet public key) as well as the verification keys $pk_A$, $pk_B$ and $pk_C$ for the subnetworks SNA, SNB and SNC. Accordingly, the root subnetwork SN0 forms a governance subnetwork.

The network 100 may comprise a plurality of interfaces 101 that may be used to exchange information with requesting entities or users U of the distributed network. As an example, the users U may send (read) requests via the interface 101 to the distributed network and receive a (read) response, e.g. execution state information comprising computational results.

Figure 2:
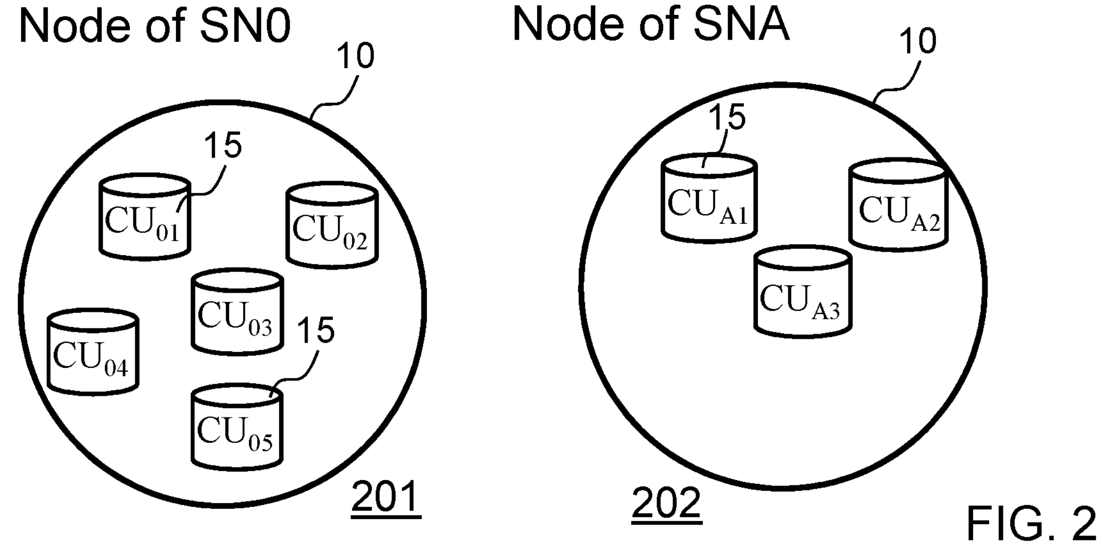
FIG. 2 illustrates in a more detailed way computational units running on an exemplary node of the network.

FIG. 2 illustrates in a more detailed way computational units 15 running on nodes 10 of the network 100. The network 100 is configured to assign each of the computational units which are running on the network 100 to one of the plurality of subnets, in this example to one of the subnets SN0, SNA, SNB or SNC according to a subnet-assignment.

More particularly, FIG. 2 shows on the left side 201 a node 10 of the root subnet SN0 of FIG. 1. The subnet assignment of the distributed network 100 has assigned a subset of five computational units 15 to the root subnet SN0, more particularly the subset of computational units CU01, CU02, CU03, CU04 and CU05. The assigned subset of computational units CU01, CU02, CU03, CU04 and CU05 runs on each node 10 of the subnet SN0. Furthermore, the assigned subset of computational units is replicated across the whole subnet SN0 such that each of the computational units CU01, CU02, CU03, CU04 and CU05 traverses the same unit states/execution states.

Furthermore, FIG. 2 shows on the right side 202 a node 10 of the application subnet SNA of FIG. 1 on which three computational units 15 are run, more particularly the set of computational units $CU_{A1}$, $CU_{A2}$ and $CU_{A3}$. The set of computational units $CU_{A1}$, $CU_{A2}$ and $CU_{A3}$ runs on each node 10 of the subnet SNB. Furthermore, the set of computational units is replicated across the whole subnet SNA such that each of the computational units $CU_{A1}$, $CU_{A2}$ and $CU_{A3}$ has the same unit state/execution state.

Figure 3:
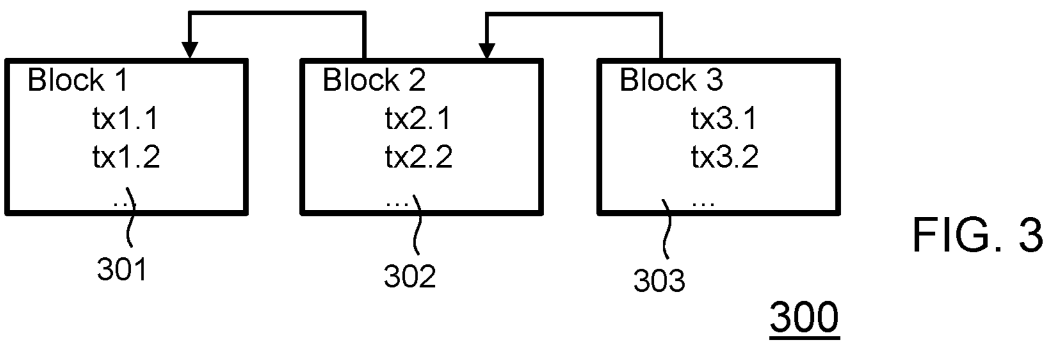
FIG. 3 illustrates the creation of blocks in distributed networks according to embodiments of the invention.

FIG. 3 illustrates the creation of blocks in distributed networks according to embodiments of the invention. The blocks may be in particular input blocks which are to be processed by the computational units of an execution subset. The blocks which are to be processed by the execution subset have been agreed upon by a consensus subset of the respective nodes of the subnet.

In this exemplary embodiment three input blocks 301, 302 and 303 are illustrated. Block 301 comprises a plurality of transactions, namely the transactions tx1.1, tx1.2 and possibly further transactions indicated with dots. Block 302 comprises also a plurality of transactions, namely the transactions tx2.1, tx2.2 and possibly further transactions indicated with dots. Block 303 also comprises a plurality of transactions, namely the transactions tx3.1, tx3.2 and possibly further transactions indicated with dots. The input blocks 301, 302 and 303 are chained together. More particularly, each of the blocks comprises a block hash of the previous block. This cryptographically ties the current block to the previous block(s).

According to embodiments the transactions may be in particular execution messages which are to be executed by the nodes of the execution subset.

According to embodiments, the input blocks 301, 302 and 303 may be created by a proof-of-stake consensus-protocol.

However, it should be noted that the input blocks generated by the consensus component do not need to be chained together according to embodiments. Rather any consensus protocol that reaches some kind of consensus between the nodes on the selection and/or processing order of received messages may be used according to embodiments.

Figure 4:
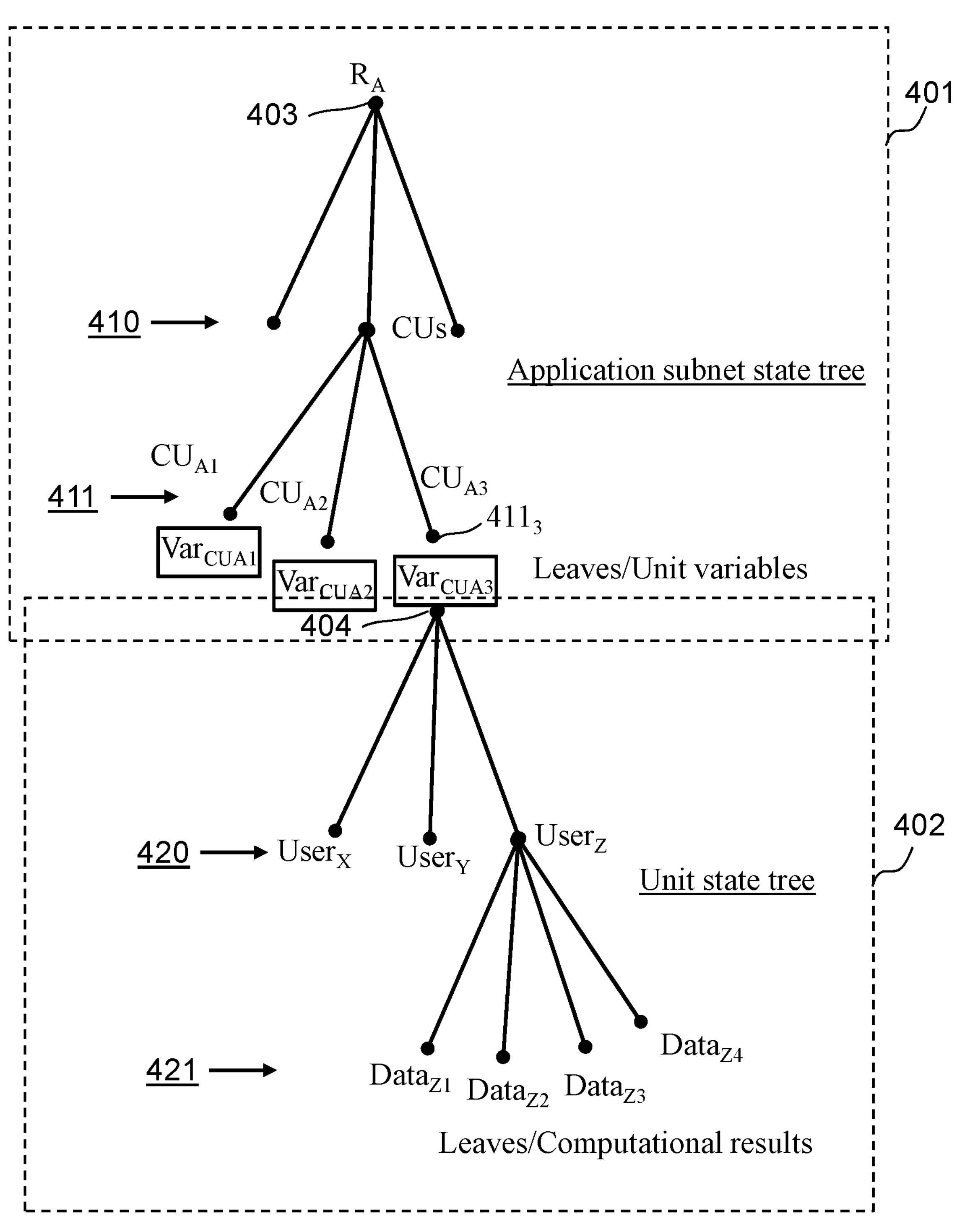
FIG. 4 shows a canonical state representation of the state of an application subnet as well as the state of a computational unit.

FIG. 4 shows an abstract state representation 400 of the state of the application subnet SNA as shown in FIGS. 1 and 2 as well as the state of the computational unit $CU_{A3}$ which runs on each node of the subnet SNA. The state representation 400 may be regarded as a generic or in other words canonical state representation.

The state representation 400 comprises an application subnet state tree 401 representing the state of the application subnet SNA. The state tree 401 comprises a root 403, $R_A$ and various nodes 410 including a node for the computational units CU. The state tree 401 further comprises leaves 411 for unit variables $Var_{CUA1}$, $Var_{CUA2}$ and $Var_{CUA3}$ of the computational units $CU_{A1}$, $CU_{A2}$ and $CU_{A3}$ respectively of the subnet SNA. The unit variables VarCUA1, VarCUA2 and VarCUA3 are securely linked with an identifier of the corresponding computational units CUA1, CUA2 and CUA3 respectively. The identifier may be e.g. just a unique number assigned to the corresponding computational unit.

FIG. 4 further shows a unit state tree 402 representing the state of the computational unit $CU_{A3}$. The unit state tree 402 comprises a root 404 and nodes 420 for users of the application subnet SNA, in this example for the users $User_X$, $User_y$ and $User_z$. The unit state tree 402 further comprises leaves 421 for computational results or generally data for the respective users. In FIG. 4 this is shown in an exemplary way for the user $User_z$ which has 4 leaves 421 for data $Data_{Z1}$, $Data_{Z2}$, $Data_{Z3}$ and $Data_{Z4}$.

The application subnet state tree 401 and the unit state tree 402 are linked via the root 404 and the leaf $411_3$ of the application subnet state tree 401 which represents the unit variables $Var_{CUA3}$ for the computational unit $CU_{A3}$. More particularly, the root 404 of the unit state tree 402 corresponds to the leaf $411_3$ of the application subnet state tree 401.

Figure 5:
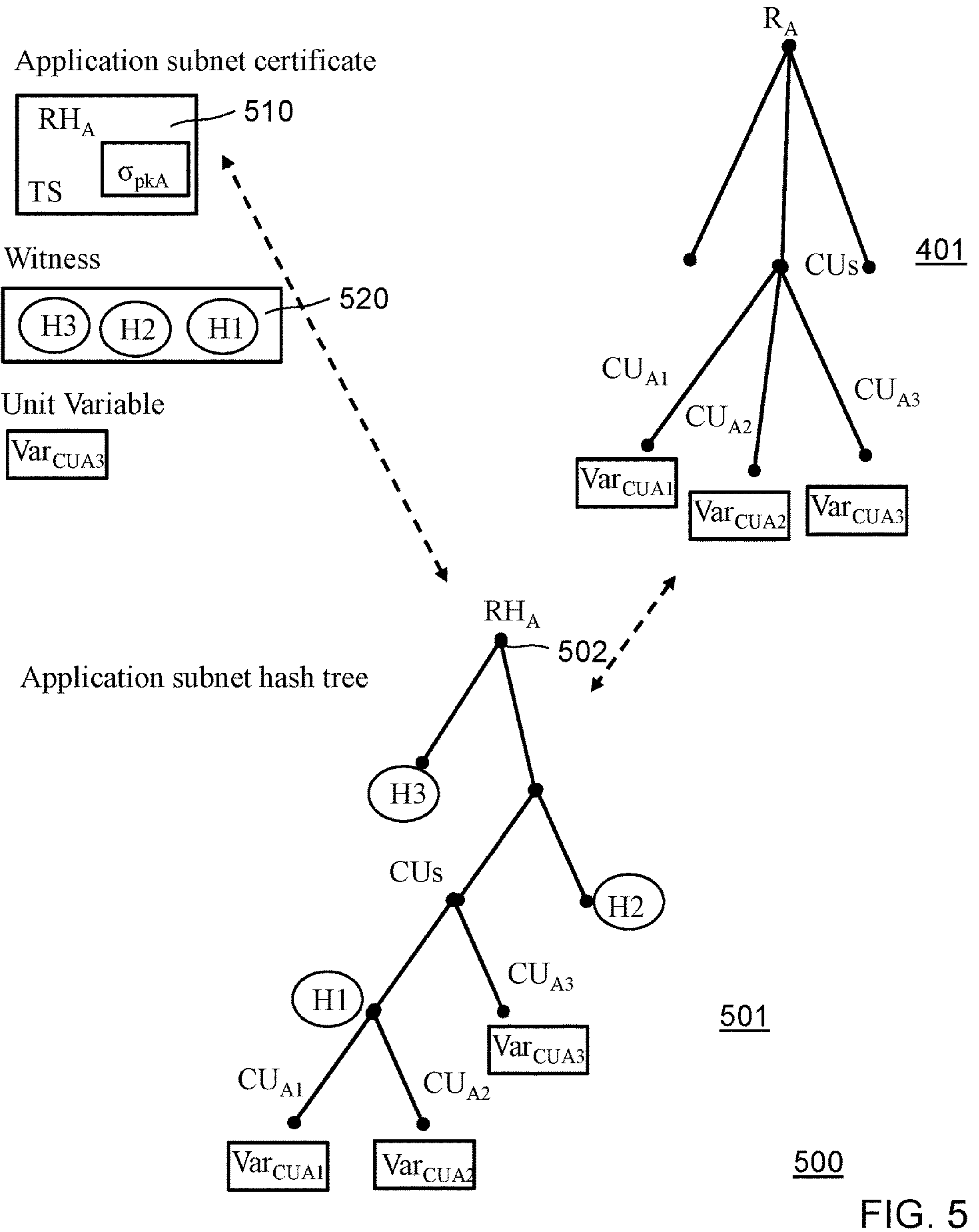
FIG. 5 illustrates a conversion of a part of the canonical state representation of FIG. 4 into a certification structure.

FIG. 5 illustrates a conversion or in other words a transformation of a part of the canonical state representation 400 of FIG. 4, more particularly of the application subnet state tree 401, into a certification structure 500 according to an embodiment of the invention. The certification structure 500 forms a structured digest of the application subnet state tree 401 which may be according to embodiments universally understandable across implementations.

In more detail, the certification structure 500 comprises an application subnet accumulator 501. The application subnet accumulator 501 is embodied as application subnet hash tree and establishes in this example a cryptographic accumulator for the subnet SNA.

The application subnet hash tree 501 may be used by the subnet SNA to certify for each of the computational units their corresponding unit variables $Var_{CUA1}$, $Var_{CUA2}$ and $Var_{CUA3}$. This is done in a very efficient way by using the hash tree structure which may be in particular a Merkle-tree structure. The application subnet hash tree 501 comprises a root hash $RH_A$, 502 which establishes a digest of the application subnet accumulator 501. The unit variables $Var_{CUA1}$, $Var_{CUA2}$ and $Var_{CUA3}$ are instantiated as leaves of the application subnet hash tree 501 and correspond to assigned accumulator elements of the computational units $CU_{A1}$, $CU_{A2}$ and $CU_{A3}$ respectively.

The nodes of the application subnet SNA execute regularly a joint signature $\sigma_{pka}$ on the root hash $RH_A$ of the application subnet state tree 501 and provide or produce thereby an application subnet certificate 510. The application subnet certificate 510 can be used to authenticate/verify the root hash $RH_A$ by verifying the joint signature $\sigma_{pka}$ with the corresponding public key/verification key $pk_A$. According to embodiments, the application subnet certificate 510 may comprise a timestamp TS. According to embodiments, the application subnet accumulator, e.g. the application subnet hash tree 501, may also comprise a time stamp, e.g. the time stamp TS. The time stamp may be incorporated e.g. as a leaf of the respective hash tree.

In order to verify one of the unit variables, e.g. the unit variable $Var_{CUA3}$ of the computational unit $CU_{A3}$, the application subnet SNA or more particularly a node of the application subnet SNA compiles or computes a witness 520 of the application subnet accumulator, i.e. in this example of the application subnet hash tree 501. The witness 520 comprises generally authentication information for authenticating the respective accumulator element of the application subnet accumulator and in this example an authenticable path between the unit variable $Var_{CUA3}$ and the root hash $RH_A$. In the example of FIG. 5 the witness 520 comprises the hashes H1, H2 and H3. With the hashes H1, H2 and H3 and the root hash $RH_A$ one can verify/authenticate the unit variable $Var_{CUA3}$.

Figure 6:
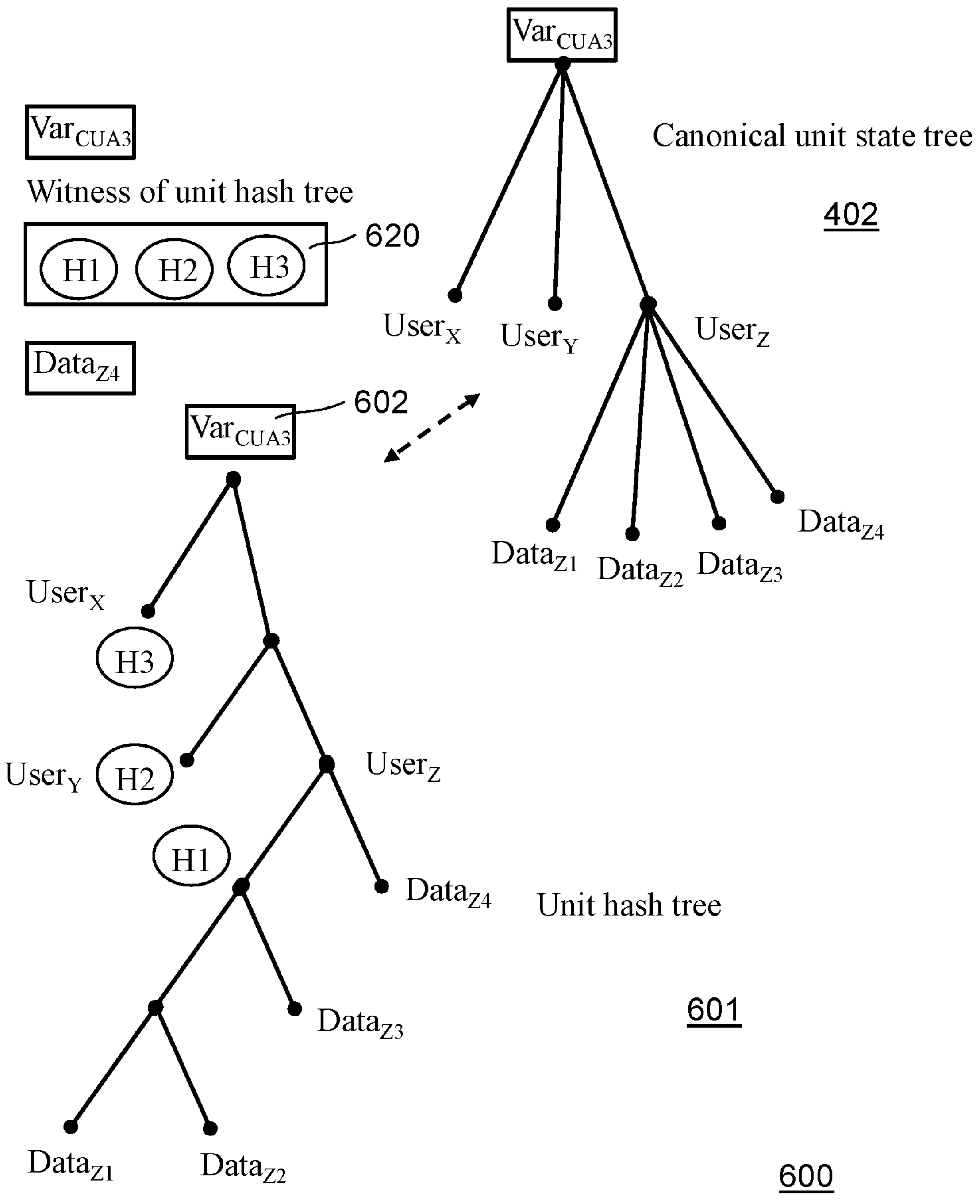
FIG. 6 illustrates a conversion of a part of the canonical state representation of FIG. 4 into a certification structure.

FIG. 6 illustrates a conversion or in other words a transformation of a part of the canonical state representation 400 of FIG. 4, more particularly of the unit state tree 402, into a certification structure 600 according to an embodiment of the invention. The certification structure 600 forms a structured digest of the unit state tree 402 which may be according to embodiments universally understandable across implementations.

In more detail, the certification structure 600 comprises a unit accumulator 601. The unit accumulator 601 is embodied as unit hash tree and establishes in this example a cryptographic accumulator for the computational unit CUA3.

The unit hash tree 601 may be used by the computational unit $CU_{A3}$ to certify computational results or more generally any data of the computational unit $CU_{A3}$. This may be done in a very efficient way by using the hash tree structure which may be in particular a Merkle-tree structure. The unit hash tree 601 comprises as root hash the unit variable $Var_{CUA3}$, 602 which generally establishes a digest of the unit accumulator 601. In this example it is assumed that the computational unit $CU_{A3}$ wants to provide a witness for the computational result/data $Data_{Z4}$.

The computational results of the computational unit $CU_{A3}$ are instantiated as leaves of the unit hash tree 601 and correspond to assigned accumulator elements of the unit accumulator 601.

In order to verify one of the computational results, e.g. the computational result/data $Data_{Z4}$ of the user $User_Z$, the computational unit $CU_{A3}$ or more particularly a node of the application subnet SNA compiles or computes a witness 620 of the unit accumulator, i.e. in this example of the unit hash tree 601. The witness 620 comprises generally authentication information for authenticating the accumulator element of the unit accumulator and in this example an authenticable path between the computational result/data $Data_{Z4}$ and the root hash $Var_{CUA3}$. In the example of FIG. 6 the witness 620 comprises the hashes H1, H2 and H3. With the hashes H1, H2 and H3 and the root hash $Var_{CUA3}$ one can verify/authenticate the computational result/data $Data_{Z4}$.

Figure 7:
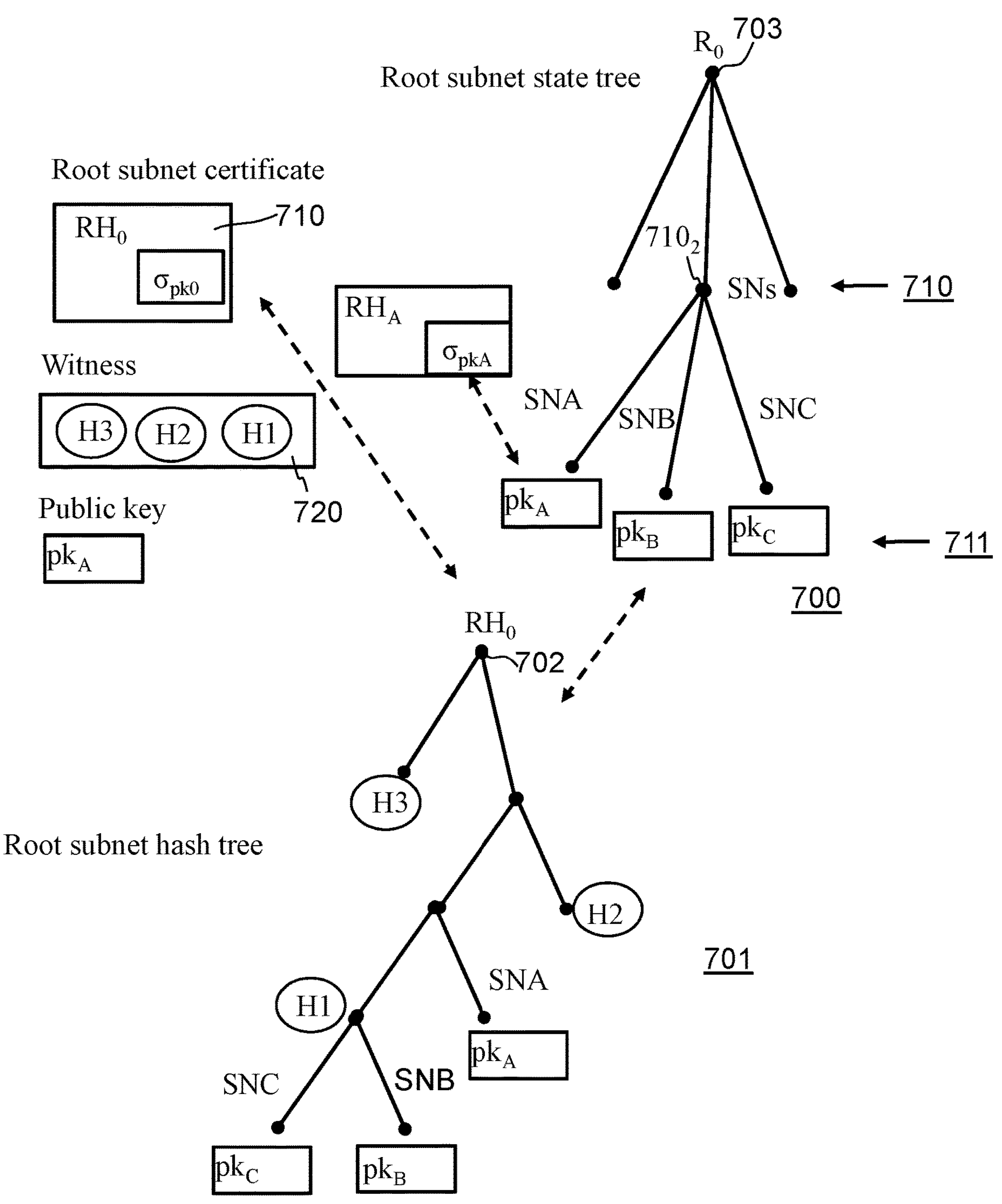
FIG. 7 shows a canonical state representation of the state of a root subnet as well as a corresponding certification structure.

FIG. 7 shows an abstract state representation 700 of the state of the root subnet SN0 as shown in FIGS. 1 and 2. The state representation 700 may be regarded as a generic or in other words canonical state representation of the root subnet SN0.

The state representation 700 is embodied as root subnet state tree 700 representing the state of the root subnet SN0. The state tree 700 comprises a root 703 and various nodes 710 including a node $710_2$ for the subnets SN. The state tree 700 further comprises leaves 711 for verification keys/public keys $pk_A$, $pk_B$ and $pk_C$ of the application subnets SNA, SNB and SNC as shown in FIGS. 1 and 2.

FIG. 7 also illustrates a conversion or in other words a transformation of a part of the canonical state representation 700 of the root subnet SN0, i.e. of the root subnet state tree 700, into a certification structure 701 according to an embodiment of the invention. The certification structure 701 forms a structured digest of the root subnet state tree 700 which may be according to embodiments universally understandable across implementations.

In more detail, the certification structure 701 may be generally embodied as cryptographic accumulator and in this example it is embodied as root subnet hash tree.

The root subnet hash tree 701 may be used to certify for each of subnets their corresponding application subnet public key. This is done in a very efficient way by using a hash tree structure which may be in particular a Merkle-tree structure. The root subnet hash tree 701 comprises a root hash $RH_0$, 702 which establishes a digest of the root subnet accumulator. The verification keys/public keys $pk_A$, $pk_B$ and $pk_C$ are instantiated as leaves of the root subnet hash tree 701 and correspond to accumulator elements of the root subnet accumulator.

The nodes of the root subnet SN0 may execute a joint signature $\sigma_{pk0}$ on the root hash $RH_0$ of the root subnet state tree 701 and provide or produce thereby a root subnet certificate 710. The root subnet certificate 710 can be used to authenticate/verify the root hash $RH_0$ by verifying the joint signature $\sigma_{pk0}$ with the corresponding root public key/verification key $pk_0$. According to embodiments it is assumed that root public key/verification key $pk_0$ is known/available to users/user entities of the distributed network or may be derived from a (central) authority of the distributed network.

However, an application subnet verification key/public key may not be generally known to a user/user entity of the network. This may apply in particular to large networks which comprise a large number of application subnets.

In order to verify one of the application subnet verification keys, e.g. the verification key $pk_A$ of the subnet SNA, the root subnet SN0 or more particularly a node of the root subnet SN0 compiles or computes a witness 720 of the root subnet accumulator, i.e. in this example of the root subnet hash tree 701. The witness 720 comprises generally authentication information for authenticating the accumulator element of the root subnet accumulator and in this example an authenticable path between the verification key $pk_A$ and the root hash $RH_0$. In the example of FIG. 7, the witness 720 comprises the hashes H1, H2 and H3. With the hashes H1, H2 and H3 and the root hash $RH_0$ (which can be verified with the root subnet certificate 710), one can verify/authenticate the verification key $pk_A$.

Figure 8:
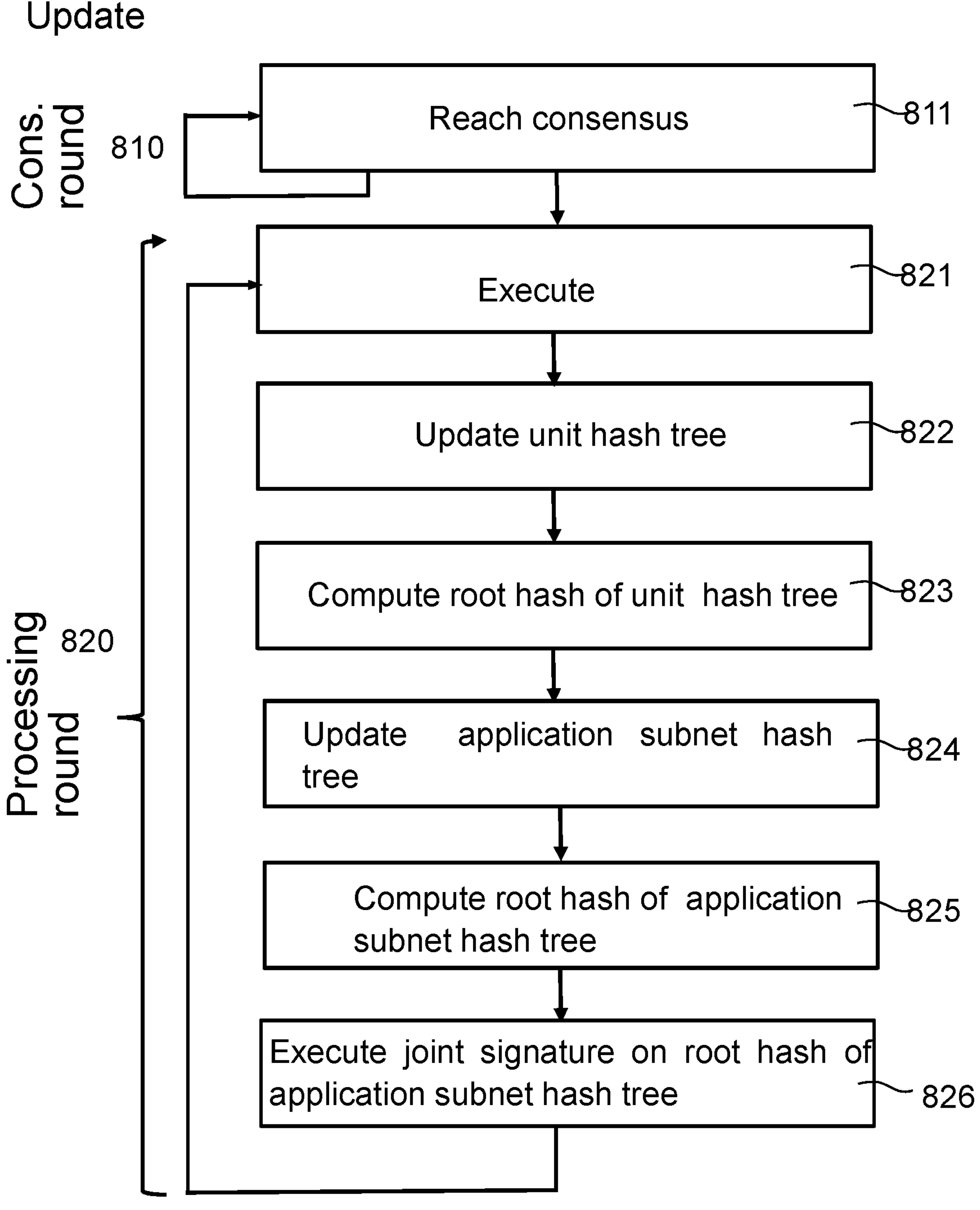
FIG. 8 shows a flow chart of methods steps of a computer-implemented method according to an embodiment of the invention.

FIG. 8 shows a flow chart 800 of methods steps of a computer-implemented method according to an embodiment of the invention. The method may be performed e.g. by one of the application subnets as shown in FIG. 1. The method illustrates in particular an update procedure for unit and application subnet accumulators.

The method performs regularly, at loops 810, a consensus protocol to reach a consensus on input blocks comprising a payload that shall be executed by a respective subnet/replicated computing cluster. The loops 810 comprises steps 811 at which the nodes/replicas of a consensus subset reach a consensus on a new input block X comprising a payload that shall be processed. The input blocks may be numbered with an increasing height index X corresponding to a processing round number.

The payloads of the input blocks that have been agreed upon are then individually executed, at steps 821, by the computational units of the nodes of the corresponding application subnet.

As a result of the execution, the nodes of the respective application subnet update the unit states of the computational units which run on the respective nodes.

Then, at a step 822, the nodes update the unit accumulators, in particular the unit hash trees, e.g. the unit hash tree 601 of the computational unit $CU_{A3}$ as shown in FIG. 6, but also the corresponding unit hash trees of the other computational units $CU_{A1}$ and $CU_{A2}$ of the subnet SNA.

At a step 823, the nodes/computational units compute the digests of the unit accumulators of the corresponding subnet, e.g. the root hash 602 of the unit hash tree 601.

At a step 824, the nodes/computational units update the unit variables of the application subnet accumulators, e.g. the unit variables $Var_{CUA1}$, $Var_{CUA2}$ and $Var_{CUA3}$ of the application subnet hash tree 501 of the computational units $CU_{A1}$, $CU_{A2}$ and $CU_{A3}$ respectively.

At a step 825, the nodes compute the digest of the application subnet accumulator, in particular of the application subnet hash tree, e.g. the root hash $RH_A$, 502 of the application subnet hash tree 501 as shown in FIG. 5. Then, at a step 826, the nodes execute a joint signature on the digest of the application subnet accumulator, e.g. on the root hash $RH_A$ of the application subnet hash tree 501 and thereby produce an application subnet certificate, e.g. the application subnet certificate 510.

The steps 821-826 are repeated at consecutive processing rounds 820. Hence each of the consecutive processing rounds involve a processing of payloads in a deterministic and replicated manner. Furthermore, at the end of each of the consecutive processing rounds 820, the unit state accumulators and the corresponding application subnet accumulators are updated.

Figure 9:
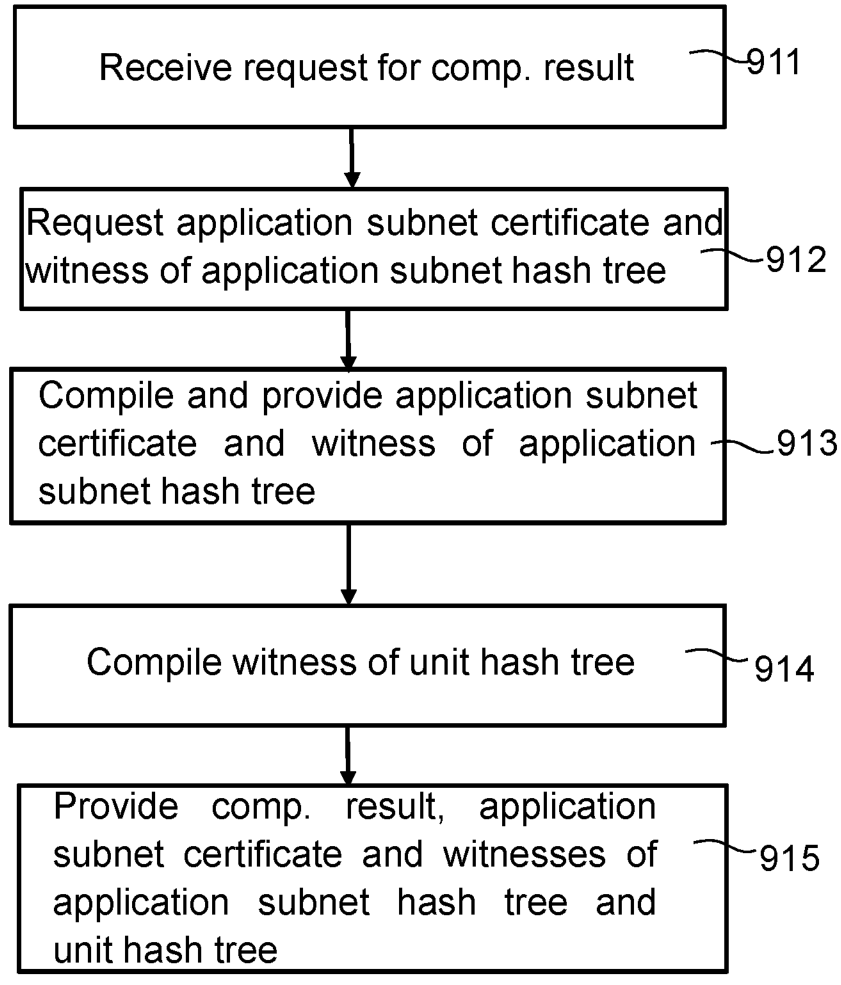
FIG. 9 shows a flow chart of methods steps of a computer-implemented method according to an embodiment of the invention.

FIG. 9 shows a flow chart 900 of methods steps of a computer-implemented method according to an embodiment of the invention. The method may be performed e.g. by one of the computational units of an application subnet as shown in FIG. 1 and illustrates a response to a request for a computational result.

At a step 911, a respective computational unit which runs on one of the nodes of the application subnet receives a request for a computational result. The request may be sent e.g. by a user entity or user of the distributed network.

At a step 912, the respective computational unit requests from the node on which it is running, e.g. from a node manager or state manager of the node, an application subnet certificate and a corresponding witness of the application subnet accumulator. The witness generally comprises authentication information for authenticating the accumulator element of the respective computational unit to which the request is issued. If the application subnet accumulator is embodied as application subnet hash tree, the witness is embodied as a witness between the root hash of the application subnet hash tree and the unit variable of the computational unit in the application subnet hash tree, e.g. the witness 520 as shown in FIG. 5.

At a step 913, the node compiles or computes the corresponding witness and provides the witness of the application subnet accumulator and the application subnet certificate to the computational unit.

At a step 914, the computational unit compiles or computes a witness of the corresponding unit accumulator. The witness comprises generally authentication information for authenticating the accumulator element of the unit accumulator corresponding to the requested computational result. If the unit accumulator is embodied as unit hash tree, the witness comprises an authenticable path between the root hash of the unit hash tree and the requested computational result stored in the corresponding leaf of the unit hash tree, e.g. the witness 620 as shown in FIG. 6.

At a step 915, the computational unit provides the (latest) application subnet certificate, the witness of the application subnet accumulator, the witness of the unit accumulator and the requested computational result as response to the request to the requestor, e.g. to the user or user entity.

Figure 10:
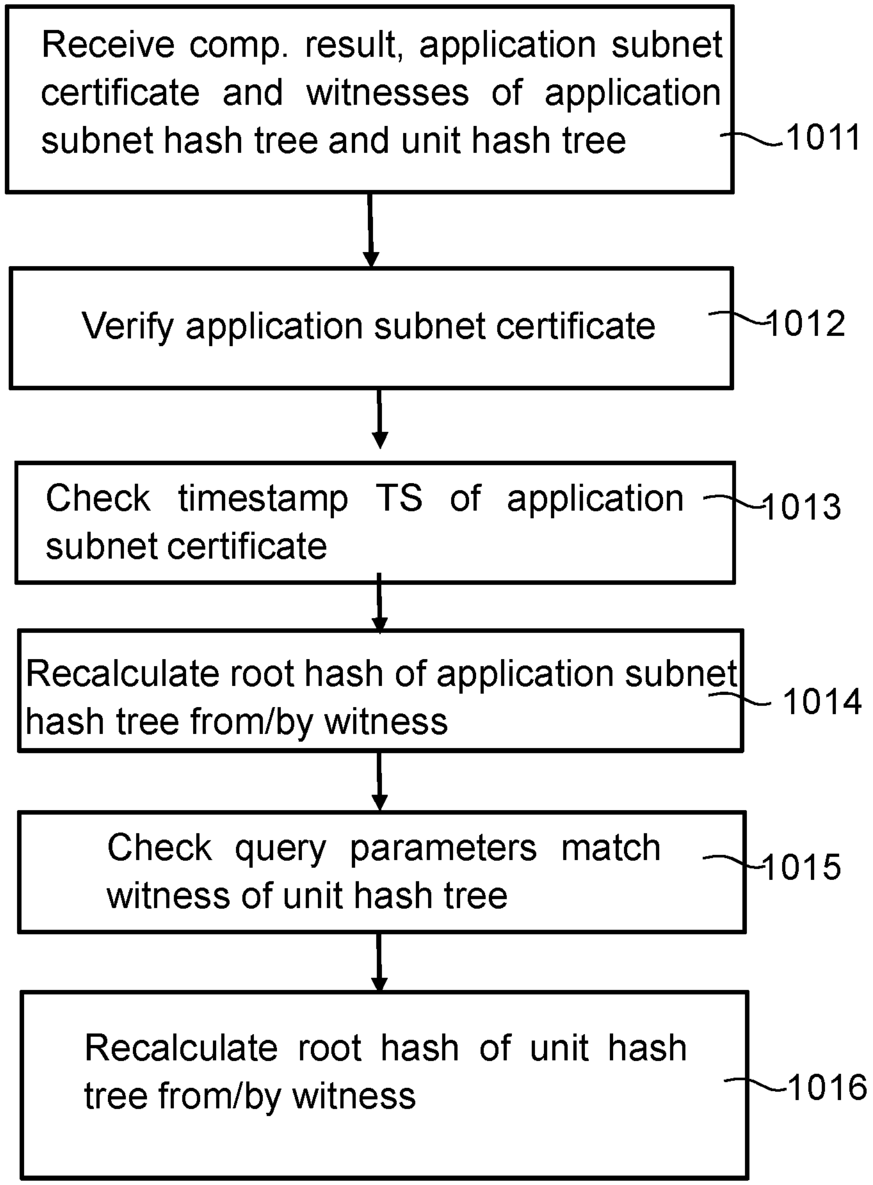
FIG. 10 shows a flow chart of methods steps of a computer-implemented method according to an embodiment of the invention.

FIG. 10 shows a flow chart 1000 of methods steps of a computer-implemented method according to an embodiment of the invention. The method may be performed e.g. by a user entity/user computer of the distributed network which has sent a request for a computational result to a node of the distributed network as described above with reference to FIG. 9.

At a step 1011, the user, e.g. the user/user entity $User_Z$ of the example of FIG. 6, receives from the node an application subnet certificate, a witness of the application subnet accumulator, a witness of the unit accumulator and the requested computational result as response to the request.

At a step 1012, the user verifies the digest of the application subnet accumulator, in particular the root hash of the application subnet hash tree, by means of the application subnet certificate. Referring e.g. to FIG. 5, the user verifies the signature $\sigma_{pkA}$ on the root hash $RH_A$ of the application subnet certificate 510 by means of the corresponding public key/verification key $pk_A$ of the subnet SNA.

At a step 1013, the user may check a timestamp of the application subnet certificate, e.g the timestamp TS of the application subnet certificate 510. This provides additional security and avoids that outdated certificates may be used.

At a step 1014, the user may verify the accumulator element of the respective computational unit by recalculating the digest of the application subnet accumulator by means of the witness of the application subnet accumulator. Referring to the example of FIG. 5, the user $User_Z$ recalculates the root hash $RH_A$, starting from its unit variable $Var_{CUA3}$, by means of the witness H1, H2 and H3 of the application subnet hash tree 501.

Then, at a step 1015, the user may check whether one or more query parameters of his query match the provided witness of the unit accumulator, e.g. the witness H1, H2 and H3 of the unit hash tree 601. As an example, if the computational unit is a banking service and the request for a computational result is a request of a user of her credit balance, then the query parameters encompass the respective user and the credit balance to ensure that an adversary may not send another response of the system which belongs e.g. to another user or comprises other information than a credit balance.

At a further step 1016, the user $User_Z$ may verify the requested computational result by recalculating the digest of the unit accumulator by means of the witness of the unit accumulator. Referring again to the example of FIG. 6, the user $User_Z$ may verify the requested and received data $Data_{Z4}$ by recalculating the root hash of the unit hash tree 601, corresponding to the unit variable $Var_{CUA3}$ by means of the witness 620.

Figure 11:
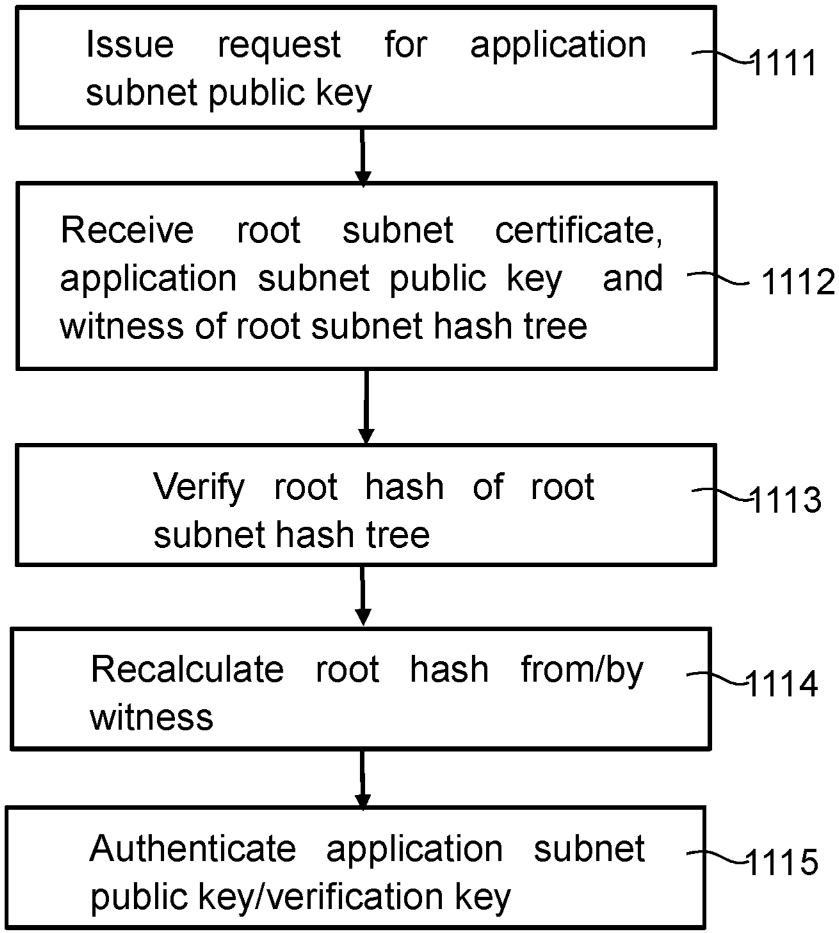
FIG. 11 shows a flow chart of methods steps of a computer-implemented method according to an embodiment of the invention.

FIG. 11 shows a flow chart 1100 of methods steps of a computer-implemented method according to an embodiment of the invention. The method may be performed e.g. by a user of the distributed network who has sent a request for a computational result to a computational unit of an application subnet, but does not have the public key/verification key of the respective application subnet. However, it is assumed that the user has a public key/verification key of a root subnet, e.g. the root subnet SN0 of FIG. 1, which is, amongst others, responsible for the issuance and management of the application subnet public keys. In the following the flow chart 1100 is explained with reference to the example of FIG. 7.

At a step 1111, the user issues a request for an application subnet public key to the root subnet, in particular to a node of the root subnet, e.g. a request for the application subnet public key $pk_A$ to the subnet SN0 as shown in FIG. 1.

At a step 1112, the user receives the application subnet public key $pk_A$, the root subnet certificate 710 and a corresponding witness 720 of the root subnet accumulator, i.e. the root subnet hash tree 701.

As mentioned above, according to other embodiments the user may receive this information as extended package together with the application subnet certificate, the witness of the application subnet accumulator, the witness of the unit accumulator and the requested computational result, e.g. in step 1011 of FIG. 10.

At a step 1113, the user verifies the digest of the root subnet accumulator by means of the root subnet certificate, i.e. the user verifies the root hash $RH_0$ of the root subnet certificate 710 by verifying the signature $\sigma_{pk0}$ by means of the root public key $pk_0$ which is assumed to be known to the user.

At a step 1114, the user recalculates the digest of the root subnet accumulator, i.e. the root hash $RH_0$, by means of the witness 720 of the root subnet accumulator, embodied as root subnet hash tree 701.

Then, upon successful verification of the root hash $RH_0$, the user may authenticate as a result the application subnet public key $pk_A$ of the application subnet SNA at a step 1115.

Figures 12A, 12B, 13:
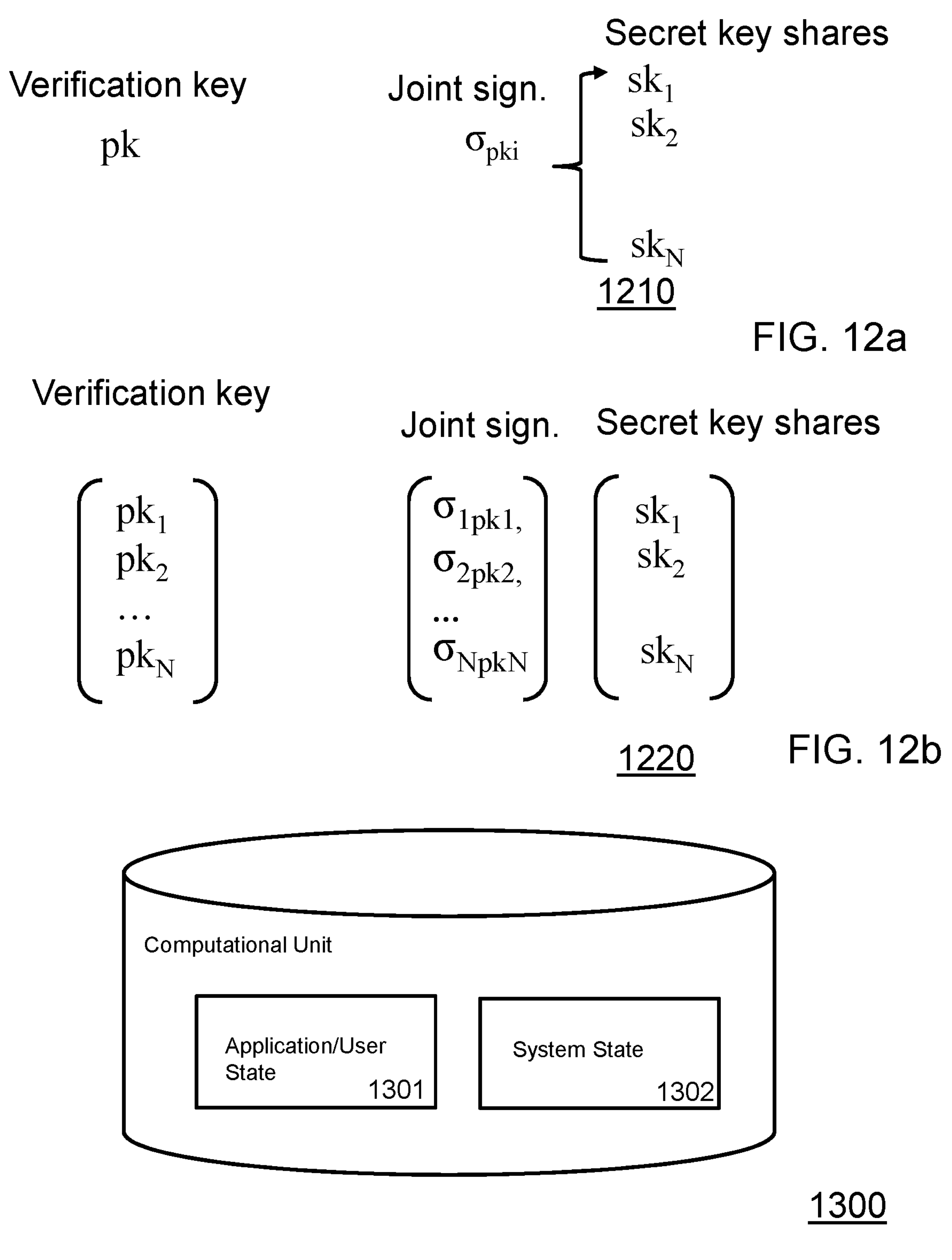
FIG. 12*a* shows an embodiment of keys which are generated by a distributed threshold key generation protocol.
FIG. 12*b* shows an embodiment of keys which are generated by a multi-signature protocol.
FIG. 13 shows a more detailed illustration of a computational unit according to an embodiment of the invention.

FIG. 12*a* shows an embodiment of keys 1210 which are generated by a distributed threshold key generation protocol, in particular by the nodes of the root subnet SN0.

It is assumed for this example that a number N of nodes participate in the distributed key generation protocol. For each of the rounds of the distributed key generation protocol each of the N nodes have a secret key share $sk_i$, wherein $i=1, \ldots, N$. The N nodes generate jointly a common public key pk, wherein a predefined threshold, e.g. at least two thirds or a third of the nodes need to agree on a new public key/new verification key and jointly sign the new public key/verification key to generate a threshold signature $\sigma_{pk}$.

FIG. 12*b* shows an embodiment of keys 1220 which are generated by a multi-signature protocol.

It is again assumed for this example that a number N of nodes participate in the distributed key generation protocol. For each of the rounds of the distributed key generation protocol each of the N nodes have a secret key share $sk_i$, wherein $i=1, \ldots, N$.

According to this embodiment, the secret key shares may be embodied as independent secret keys $sk_i$. The N nodes agree jointly on a common public key/common verification key $\overrightarrow{pk}$, which is embodied as a vector. Again, a predefined threshold, e.g. at least two thirds of the nodes or a third of the nodes need to provide a signature on the new public key/verification key $\overrightarrow{pk}$ with its secret keys (key shares). According to this embodiment the N nodes execute individual signatures $\sigma_{1pk1}, \sigma_{2pk2}, \ldots, \sigma_{NpkN}$ on the corresponding elements of the vector verification key $\overrightarrow{pk}$ with their individual secret keys $sk_1, sk_2, \ldots, sk_N$. More particularly, each of the individual signatures $\sigma_{ipki}$ have a corresponding individual public key $pk_i$. Hence according to such an embodiment the verification key is embodied as vector $\overline{pk}=(pk_1, pk_2, \ldots pk_N)$ of individual public keys $pk_i$ and the joint signature is embodied as a vector $\overrightarrow{\sigma_{pk}}=(\sigma_{1pk1}, \sigma_{2pk2}, \ldots, \sigma_{NpkN})$ as well.

According to other embodiments, also an aggregated signature scheme may be used.

In the following, some more details of distributed key generation protocols which may be used according to embodiments of the invention are given.

FIG. 13 shows a more detailed illustration of a computational unit 1300 according to an embodiment of the invention.

The computational unit 1300 comprises a user or application state 1301 and a system state 1302.

The user state 1301 consists of a main Web Assembly (WASM) module which implements the functionality of the computational unit and its dependent modules, together with an instance of each of the modules. A WASM module instance consists of memories, global variables and tables.

The system state 1302 cannot be freely modified by code of the computational unit. It includes meta-data, other state maintained by the system on behalf of the computational units, notably the compiled form of the WASM modules, and context and callbacks for outstanding messages.

Figure 14:
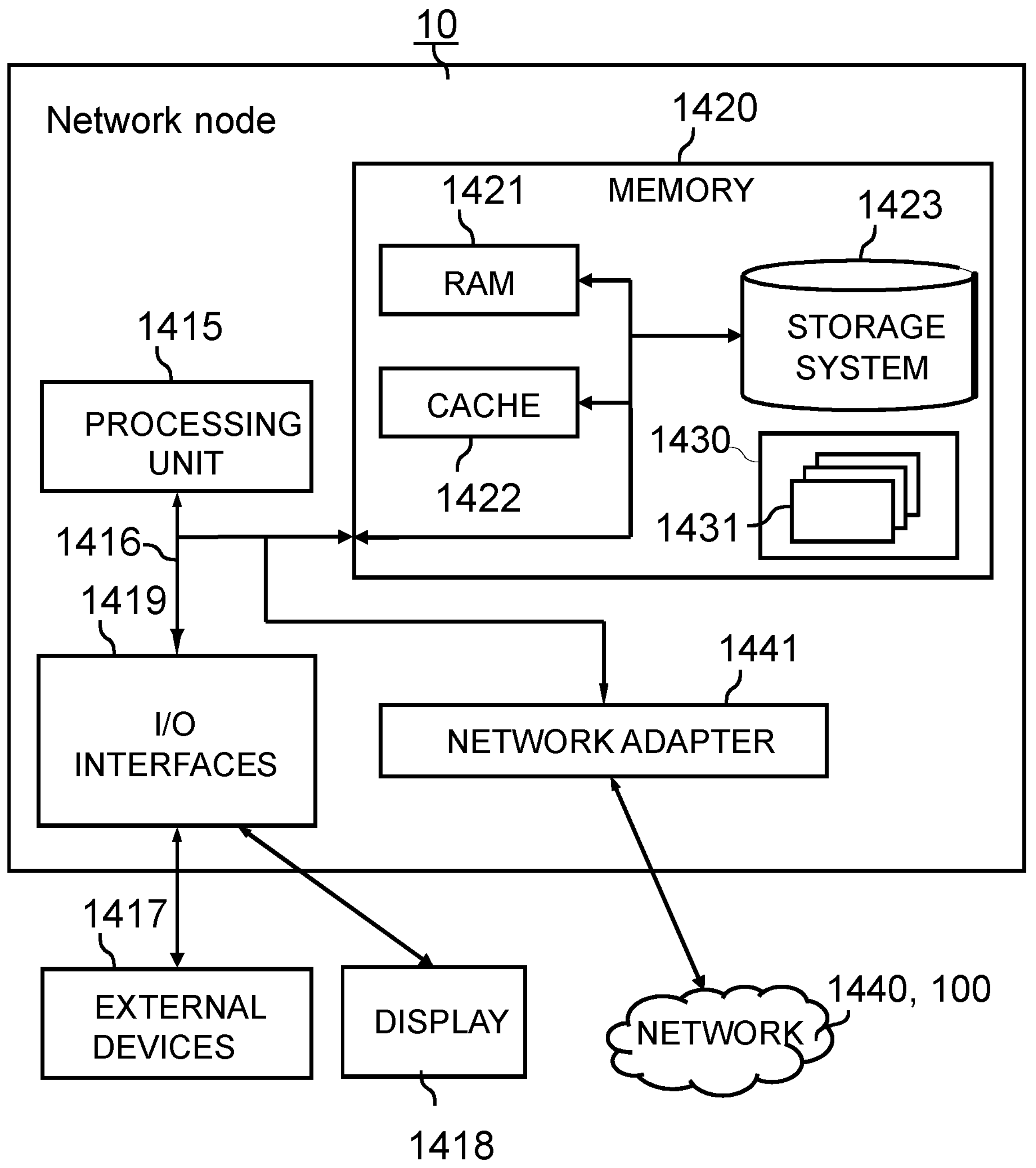
FIG. 14 shows an exemplary embodiment of a node according to an embodiment of the invention.

Referring now to FIG. 14, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for providing a user of a distributed network access to computational results computed by the distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1415, a system memory 1420, and a bus 1416 that couples various system components including system memory 1420 to processor 1415.

Bus 1416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1420 can include computer system readable media in the form of volatile memory, such as random access memory (RAM) 1421 and/or cache memory 1422. Network node 1410 may further include other removable/nonremovable, volatile/non-volatile computer system storage media. By way of example only, storage system 1423 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, nonvolatile optical disk such as a CD-ROM, DVD-ROM or other optical media can be provided. In such instances, each can be connected to bus 1416 by one or more data media interfaces. As will be further depicted and described below, memory 1420 may include at least one computer program product having a set (e.g., at least one) of program modules that are configured to carry out the functions of embodiments of the invention.

Program/utility 1430, having a set (at least one) of program modules 1431, may be stored in memory 1420 by way of example, and not limitation, as well as an operating system, one or more application programs, other program modules, and program data. Each of the operating system, one or more application programs, other program modules, and program data or some combination thereof, may include an implementation of a networking environment. Program modules 1431 generally carry out the functions and/or methodologies of embodiments of the invention as described herein. Program modules 1431 may carry out in particular one or more steps of a computer-implemented method for providing a user of a distributed network access to computational results computed by the distributed network, e.g. of one or more steps of the methods as described above.

Network node 10 may also communicate with one or more external devices 1417 such as a keyboard or a pointing device as well as a display 1418. Such communication can occur via Input/Output (I/O) interfaces 1419. Still yet, network node 10 can communicate with one or more networks 40 such as a local area network (LAN), a general wide area network (WAN), and/or a public network (e.g., the Internet) via network adapter 1441. According to embodiments the network 1440 may be in particular a distributed network comprising a plurality of network nodes 10, e.g. the network 100 as shown in FIG. 1. As depicted, network adapter 1441 communicates with the other components of network node 10 via bus 1416. It should be understood that although not shown, other hardware and/or software components could be used in conjunction with network node 10.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A computer-implemented method for signing data in a distributed network, the distributed network comprising at least one application subnet, the method comprising:

regularly computing, by a plurality of nodes of an application subnet in the distributed network, a digest of an application subnet accumulator, wherein the application subnet comprises a plurality of nodes, wherein each of the plurality of nodes of the application subnet is configured to run an assigned set of two or more computational units, wherein the two or more computational units are pieces of software that comprise their own unit state and wherein the assigned set of the two or more computational units is replicated across the application subnet by individually executing on each node, by the two or more computational units of the assigned set running on each node, computations in a deterministic and replicated manner across the application subnet, and wherein the application subnet accumulator comprises for each of the computational units of a respective application subnet an assigned accumulator element as unit variable;

regularly executing, by the plurality of nodes of the application subnet, a joint signature on the digest of the application subnet accumulator, thereby producing an application subnet certificate;

regularly computing, by each of the computational units of the application subnet, a digest of a unit accumulator, the unit accumulator comprising a representation of the unit state of the respective computational unit, wherein accumulator elements of the unit accumulator comprise computational results of the respective computational unit; and regularly writing the digest of the unit accumulator as unit variable into the corresponding accumulator element of the application subnet accumulator.

2. The computer-implemented method according to claim 1, further comprising:

regularly updating, by the plurality of computational units of the application subnet, the corresponding unit variables of their assigned accumulator elements of the application subnet accumulator.

3. The computer-implemented method according to claim 1, wherein the application subnet accumulator and/or the unit accumulator are embodied as cryptographic accumulators.

4. The computer-implemented method according to claim 1, wherein the application subnet accumulator is embodied as application subnet hash tree;

the digest of the application subnet accumulator is embodied as root hash of the application subnet hash tree; and the assigned accumulator elements of the one or more computational units are embodied as leaves of the application subnet hash tree.

5. The computer-implemented method according to claim 1, wherein the unit accumulator is embodied as unit hash tree;

the digest of the unit accumulator is embodied as root hash of the unit hash tree; and the assigned accumulator elements of the unit accumulator are embodied as leaves of the unit hash tree.

6. The computer-implemented method according to claim 1, wherein the unit variables of the computational units are securely linked with an identifier of the corresponding computational units.

7. The computer-implemented method according to claim 1, wherein the joint signature is a threshold-signature.

8. The computer-implemented method according to claim 1, wherein the joint signature is a multi-signature.

9. The computer-implemented method according to claim 1, further comprising:

receiving a request for computational results of one of the plurality of computational units of the application subnet;

computing a witness of the application subnet accumulator, the witness comprising authentication information for authenticating the accumulator element of the application subnet accumulator of the respective computational unit;

computing a witness of the unit accumulator, the witness comprising authentication information for authenticating the accumulator element of the unit accumulator of the requested computational result; and providing the latest application subnet certificate, the witness of the application subnet accumulator, the witness of the unit accumulator and the requested computational result as response to the request.

10. The computer-implemented method according to claim 1, further comprising:

performing consecutive consensus rounds to reach a consensus on a sequence of payloads;

performing consecutive processing rounds comprising a consecutive processing of the sequence of payloads in a deterministic and replicated manner; and updating the application subnet accumulator at the end of each of the consecutive processing rounds.

11. The computer-implemented method according to claim 10, further comprising:

updating, by each of the computational units of the application subnet, at the end of each of the processing rounds, the unit accumulator; and the corresponding unit variable of the application subnet accumulator.

12. The computer-implemented method according to claim 1, the distributed network comprising a plurality of application subnets and a root subnet, the root subnet comprising a plurality of root nodes, wherein each of the plurality of root nodes of the root subnet is configured to run one or more computational units, wherein the computational units of the root subnet are configured to execute computations in a deterministic and replicated manner across the root subnet, the method further comprising:

regularly computing, by the plurality of root nodes, a root subnet accumulator, the root subnet accumulator comprising for each of the plurality of application subnets an assigned accumulator element as key variable, the assigned accumulator element comprising an application subnet public key of the corresponding application subnet;

regularly executing, by the root nodes of the root subnet, a joint signature on the digest of the root subnet accumulator, thereby producing a root subnet certificate.

13. The computer-implemented method according to claim 12, further comprising:

receiving, by the root subnet, a request for an application subnet public key of one of the application subnets of the plurality of application subnets;

computing a witness of the root subnet accumulator, the witness comprising authentication information for authenticating the accumulator element of the respective application subnet; and providing the latest root subnet certificate, the witness of the root subnet accumulator and the respective application subnet public key as response to the request.

14. The computer-implemented method according to claim 1, wherein the root subnet accumulator is embodied as root subnet hash tree;

the digest of the root subnet accumulator is embodied as root hash of the root subnet hash tree; and the assigned accumulator element is embodied as leaf of the root subnet hash tree.

15. The method according to claim 1, further comprising:

providing different representations of the application subnet accumulator, the unit accumulator and/or the root subnet accumulator; and performing an adaptive transformation between the different representations of the application subnet accumulator, the unit accumulator and/or the root subnet accumulator; wherein the different representations encompass in particular a canonical state representation;

a partial canonical state representation; and a hash tree state representation.

16. A computer-implemented method for authenticating data of a distributed network, the distributed network comprising at least one application subnet, the method comprising:

regularly computing a digest of a unit accumulator, wherein an application subnet in the distributed network comprises a plurality of nodes, wherein each of the plurality of nodes of the application subnet is configured to run an assigned set of two or more computational units, wherein the two or more computational units are pieces of software that comprise their own unit state and wherein the assigned set of the two or more computational units is replicated across the application subnet by individually executing on each node, by the two or more computational units of the assigned set running on each node, computations in a deterministic and replicated manner across the application subnet, and wherein the digest of the unit accumulator is regularly computed by each of the computational units of the application subnet, and the unit accumulator comprises a representation of the unit state of the respective computational unit, wherein accumulator elements of the unit accumulator comprise computational results of the respective computational unit;

regularly writing the digest of the unit accumulator as unit variable into the corresponding accumulator element of the application subnet accumulator;

issuing a request to a node of the application subnet for a computational result of one of the computational units of the application subnet;

receiving, from the node to which the request is issued, an application subnet certificate, a witness of the application subnet accumulator, a witness of the unit accumulator and the requested computational result as response to the request;

verifying the digest of the application subnet accumulator by means of the application subnet certificate;

verifying the accumulator element of the respective computational unit by recalculating the digest of the application subnet accumulator by means of the witness of the application subnet accumulator; and verifying the requested computational result by recalculating the digest of the unit accumulator by means of the witness of the unit accumulator.

17. The computer-implemented method according to claim 16, the method further comprising:

issuing a request for an application subnet public key;

receiving the application subnet public key, the root subnet certificate and a corresponding witness of the root subnet accumulator;

verifying the digest of the root subnet accumulator by means of the root subnet certificate; and verifying the application subnet public key by recalculating the digest of the root subnet accumulator by means of the witness of the root subnet accumulator.

18. The computer-implemented method according to claim 17, wherein the application subnet accumulator, the unit accumulator and/or the root subnet accumulator are embodied as Merkle-trees.

19. A distributed network comprising: at least one application subnet, wherein the application subnet comprises a plurality of nodes, wherein each of the plurality of nodes of the application subnet is configured to run an assigned set of two or more computational units, wherein the two or more computational units are pieces of software that comprise their own unit state and wherein the assigned set of the two or more computational units is replicated across the application subnet by individually executing on each node, by the two or more computational units of the assigned set running on each node, computations in a deterministic and replicated manner across the application subnet, the network being configured to regularly compute, by the plurality of nodes of the application subnet, a digest of an application subnet accumulator, the application subnet accumulator comprising for each of the computational units of a respective application subnet an assigned accumulator element as unit variable;

regularly execute, by the nodes of the application subnet, a joint signature on the digest of the application subnet accumulator, thereby producing an application subnet certificate;

regularly compute, by each of the computational units of the application subnet, a digest of a unit accumulator, the unit accumulator comprising a representation of the unit state of the respective computational unit, wherein accumulator elements of the unit accumulator comprise computational results of the respective computational unit; and regularly write the digest of the unit accumulator as unit variable into the corresponding accumulator element of the application subnet accumulator.

20. A computer program product comprising a non-transitory computer readable storage medium having program instructions embodied therewith, the program instructions executable by one or more processors to perform a method comprising:

regularly computing, by a plurality of nodes of an application subnet in a distributed network, a digest of an application subnet accumulator, wherein each of the plurality of nodes of the application subnet is configured to run an assigned set of two or more computational units, wherein the two or more computational units are pieces of software that comprise their own unit state and wherein the assigned set of the two or more computational units is replicated across the application subnet by individually executing on each node, by the two or more computational units of the assigned set running on each node, computations in a deterministic and replicated manner across the application subnet, and wherein the application subnet accumulator comprises for each of the computational units of a respective application subnet an assigned accumulator element as unit variable; and regularly executing a joint signature on the digest of the application subnet accumulator, thereby producing an application subnet certificate;

regularly computing, by each of the computational units of the application subnet, a digest of a unit accumulator, the unit accumulator comprising a representation of the unit state of the respective computational unit, wherein accumulator elements of the unit accumulator comprise computational results of the respective computational unit; and regularly writing the digest of the unit accumulator as unit variable into the corresponding accumulator element of the application subnet accumulator.

* * * * *